US008239708B2

(12) United States Patent  (10) Patent No.: US 8,239,708 B2
Park et al.  (45) Date of Patent: Aug. 7, 2012

(54) SYSTEM ON CHIP (SOC) DEVICE VERIFICATION SYSTEM USING MEMORY INTERFACE

(75) Inventors: Jin-kwon Park, Suwon-si (KR); Cheon-su Lee, Seoul (KR); Jae-shin Lee, Seoul (KR); Min-Joung Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 228 days.

(21) Appl. No.: 12/455,207

(22) Filed: May 29, 2009

(65) Prior Publication Data

US 2010/0017656 A1  Jan. 21, 2010

(30) Foreign Application Priority Data

Jul. 16, 2008 (KR) ........................ 10 2008 0069299

(51) Int. Cl.
*G06F 11/26* (2006.01)
(52) U.S. Cl. ............................... 714/30; 714/27; 714/44
(58) Field of Classification Search ...................... 714/30
See application file for complete search history.

(56) References Cited

U.S. PATENT DOCUMENTS

| | | | | |
|---|---|---|---|---|
| 5,036,493 A | * | 7/1991 | Nielsen | 365/230.03 |
| 6,487,699 B1 | * | 11/2002 | Devins et al. | 716/106 |
| 6,615,167 B1 | * | 9/2003 | Devins et al. | 703/28 |
| 6,691,251 B2 | * | 2/2004 | Wong | 714/28 |
| 6,834,368 B2 | | 12/2004 | Nozuyama | |
| 2002/0059547 A1 | | 5/2002 | Nozuyama | |
| 2003/0004699 A1 | * | 1/2003 | Choi et al. | 703/14 |
| 2003/0093764 A1 | * | 5/2003 | Devins et al. | 716/5 |
| 2003/0149946 A1 | * | 8/2003 | Devins et al. | 716/4 |
| 2005/0228616 A1 | * | 10/2005 | Huang et al. | 702/181 |
| 2006/0143526 A1 | * | 6/2006 | So et al. | 714/31 |
| 2006/0212764 A1 | * | 9/2006 | Slobodnik et al. | 714/718 |
| 2007/0180413 A1 | * | 8/2007 | Park | 716/5 |
| 2007/0220456 A1 | * | 9/2007 | Duan et al. | 716/4 |
| 2008/0022172 A1 | * | 1/2008 | Yi et al. | 714/726 |
| 2008/0133206 A1 | * | 6/2008 | Devins et al. | 703/15 |
| 2008/0162071 A1 | * | 7/2008 | Stevens et al. | 702/122 |
| 2008/0313583 A1 | * | 12/2008 | Brinson et al. | 716/4 |
| 2009/0112548 A1 | * | 4/2009 | Conner | 703/13 |

FOREIGN PATENT DOCUMENTS

| | | |
|---|---|---|
| JP | 2002100738 | 4/2002 |
| KR | 20040046477 | 6/2004 |
| KR | 20060018542 A | 3/2006 |
| KR | 20060087039 A | 8/2006 |

* cited by examiner

*Primary Examiner* — Scott Baderman
*Assistant Examiner* — Chae Ko
(74) *Attorney, Agent, or Firm* — Onello & Mello, LLP (57) ABSTRACT

A system on a chip (SoC) device verification system comprises: an SoC device model including one or more IPs and a memory controller; an external IP verification model receiving an instruction from the SoC device model and verifying operation of the one or more IPs included in the SoC device model; and a bus select model selecting one of the external IP verification model and an external device in response to a memory control signal received from the memory controller of the SoC device model.

11 Claims, 6 Drawing Sheets

SYSTEM ON CHIP (SOC) DEVICE VERIFICATION SYSTEM USING MEMORY INTERFACE

CROSS-REFERENCE TO RELATED APPLICATIONS

This application claims the benefit of Korean Patent Application No. 10-2008-0069299, filed on Jul. 16, 2008, in the Korean Intellectual Property Office, the disclosure of which is incorporated herein in its entirety by reference.

BACKGROUND

The inventive concept relates to a system for verifying a system on a chip (SoC) including one or more IPs, and more particularly, to an SoC device verification system for connecting an internal IP verification model of an SoC device and an external IP verification model by using a memory controller included by an SoC. IPs are circuit design modules or design objects that are commonly employed in SoC design. A collection of IPs, each of a known function, and each being modeled and pre-tested for performance and functionality, can be joined in an SoC design to create a device of greater functionality.

A system on a chip (SoC) is a device whereby all components of an electronic system are integrated onto a single integrated chip. It is common for SoC devices to initially include an integrated processor and a few IPs during an initial stage of development. However, during later stages of development, it is common for most SoC devices to include several tens of IPs as a part of the design process using various computer aided engineering (CAE) tools. As SoC integration continues to improve, the SoC devices increase in size and functionality, and therefore, include an ever-increasing number of IPs. Therefore, it continues to become more important to reduce SoC device development time.

SUMMARY

The inventive concept provides a system on a chip (SoC) device verification system for connecting an internal IP verification model of an SoC device and an external IP verification model using a common memory interface.

In one aspect, a system on a chip (SoC) device verification system comprises: an SoC device model including one or more IPs and a memory controller; an external IP verification model receiving an instruction from the SoC device model and verifying operation of the one or more IPs included in the SoC device model; and a bus select model selecting one of the external IP verification model and an external device in response to a memory control signal received from the memory controller of the SoC device model.

The bus select model can transmit a common model interface signal to the external IP verification model when selecting the external IP verification model, and can transmit the memory control signal to the external device when selecting the external device.

The external device can be an external memory.

The external IP verification model can comprise: an IP verifying unit that verifies the operation of the one or more IPs included in the SoC device mode; and a common model interface signal converting unit receiving the common model interface signal from the bus select model and converting the common model interface signal into a signal that is compatible with the IP verifying unit, wherein the IP verifying unit verifies the operation of the one or more IPs in response to the signal generated by the common model interface signal converting unit.

The bus select model can comprise: a memory control signal input/output unit receiving the memory control signal; a memory model select signal generating unit determining a type of a memory instructed by the memory control signal and generating a memory model select signal; a model input/output signal converting unit converting the memory control signal into the common model interface signal based on the memory control signal received from the memory control signal input/output unit and the memory model select signal received from the memory model select signal generating unit; and a model selecting unit receiving the common model interface signal from the model input/output signal converting unit and transmitting the common model interface signal to a corresponding external model.

The common model interface signal can comprise an address signal, wherein the model selecting unit selects the external model based on the address signal.

The external IP verification model can transfer an event that occurs therein to the SoC device model as an external interrupt.

The SoC device model can further comprise: an interrupt controller receiving the external interrupt transferred by the external IP verification model.

The bus select model can select one of the external IP verification model and the external device based on an address or data included in the memory control signal.

At least one of the SoC device model, the external IP verification model and the bus select model is described by a register transfer level (RTL).

In another aspect, a SoC device verification system comprises: an SoC device model including a plurality of IPs and a memory controller; a plurality of external IP verification models receiving an instruction from the SoC device model and verifying operation of each of the plurality of IPs included in the SoC device model; and a bus select model selecting one of the plurality of external IP verification models in response to a memory control signal received from the memory controller of the SoC device model.

The bus select model can further select one of the plurality of external IP verification models and the external memory in response to the memory control signal.

The bus select model can select one of the plurality of external IP verification models based on an address or data included in the memory control signal.

BRIEF DESCRIPTION OF THE DRAWINGS

Exemplary embodiments of the inventive concept will be more clearly understood from the following detailed description taken in conjugation with the accompanying drawings in which.

DETAILED DESCRIPTION OF EMBODIMENTS

The attached drawings for illustrating embodiments of the present invention are referred to in order to gain a sufficient understanding of the embodiments of the present invention, the merits thereof, and the objectives accomplished by the implementation of the present invention. The present invention will now be described more fully with reference to the accompanying drawings, in which exemplary embodiments are shown.

A circuit design or device can be described or modelled using a hardware description language (HDL) at several hierarchical levels, including a behaviour level, a register transfer level (RTL), and a gate level. The behaviour level is used to describe the device in view of its functional characteristics. The gate level is used to describe the device by using real logic gates for realizing the function of the device. The RTL is used to describe the device at an intermediate level between the behaviour level and the gate level. In the present specification, the RTL is used to describe a device, unless otherwise expressed.

The following four operations are commonly used to verify the operation of a system on a chip (SoC) device.

1. The RTL is used to describe an SoC device model of the device.

2. A logic simulation program is used to verify the respective internal operation of internal IPs of the SoC device model.

3. After an external IP verification model is generated, the logic simulation program is used to verify the interface operation externally with regard to each internal IP of the SoC device model of the device.

4. The logic simulation program is then used to verify the overall operation of the SoC device model of the device.

Figure 1:
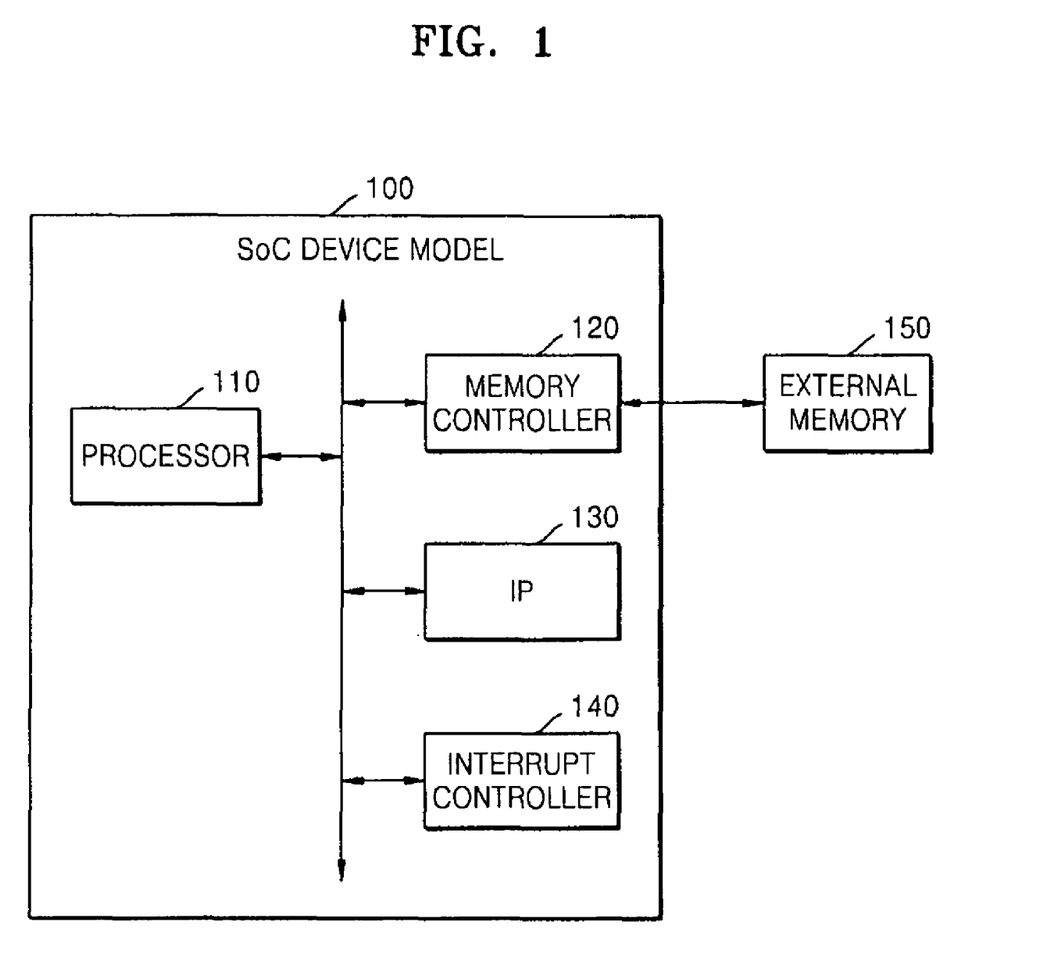
FIG. 1 is a block diagram of a system on a chip (SoC) device model.

FIG. 1 is a block diagram of an SoC device model 100. Referring to FIG. 1, the SoC device model 100 comprises one or more IPs 130, a processor 110, a memory controller 120 and an interrupt controller 140. The SoC device model 100 communicates data with an external memory 150 via the memory controller 120.

Figure 2:
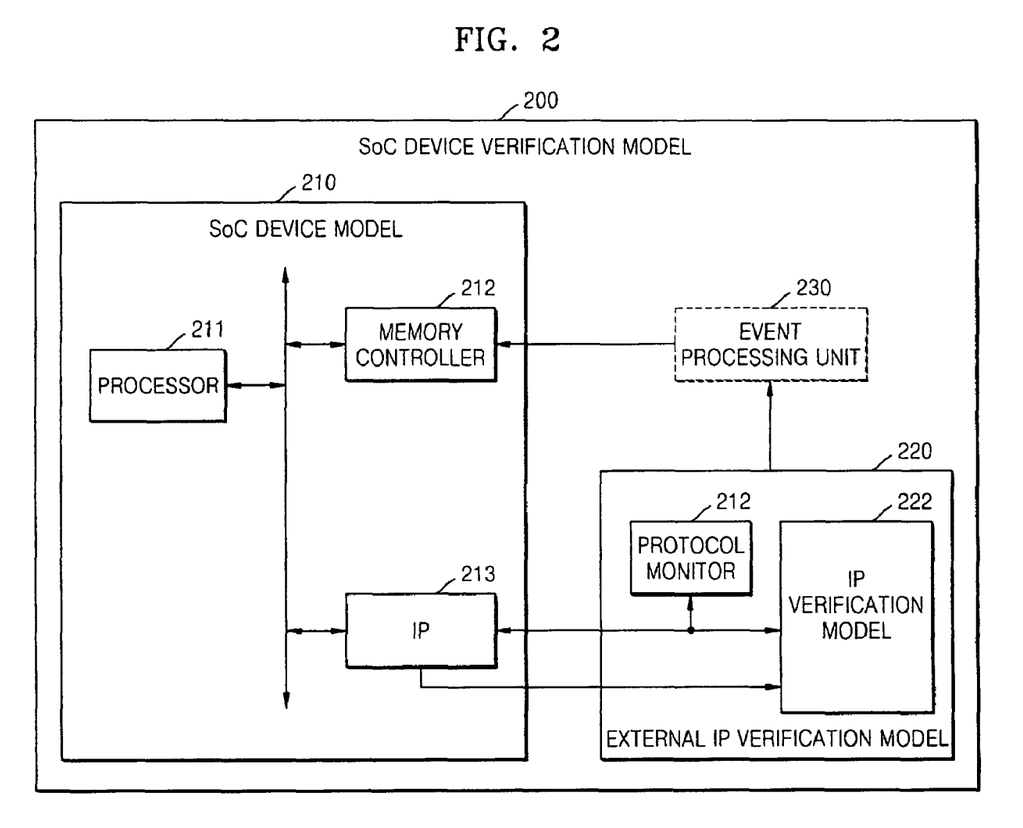
FIG. 2 is a block diagram of a comparative example of an SoC device verification model.

FIG. 2 is a block diagram of a comparative example of an SoC device verification model 200. Referring to FIG. 2, the SoC device verification model 200 comprises an SoC device model 210 that is described by the RTL, an external IP verification model 220 that is described by the RTL, and an event processing unit 230 that is described by a programming language.

Each internal IP 213 of the SoC device model 210 and an external interface thereof are verified by directly connecting the external IP verification model 220 and each internal IP 213 of the SoC device model 210 and by monitoring internal signals of the SoC device model 210 as input and output signals by the external IP verification model 220.

However, when each internal IP 213 of the SoC device model 210 and the external IP verification model 220 are directly connected, if the external IP verification model 220 is changed or if the structure of any of the internal IPs 213 of the SoC device model 210 is changed, input and output interfaces need to be corrected accordingly, which consumes time and can cause testing error due to various factors.

Also, it is common for each internal IP 213 to have unique input and output signals, which makes it difficult to correct all connections when the SoC device model 210 is changed.

Figure 3:
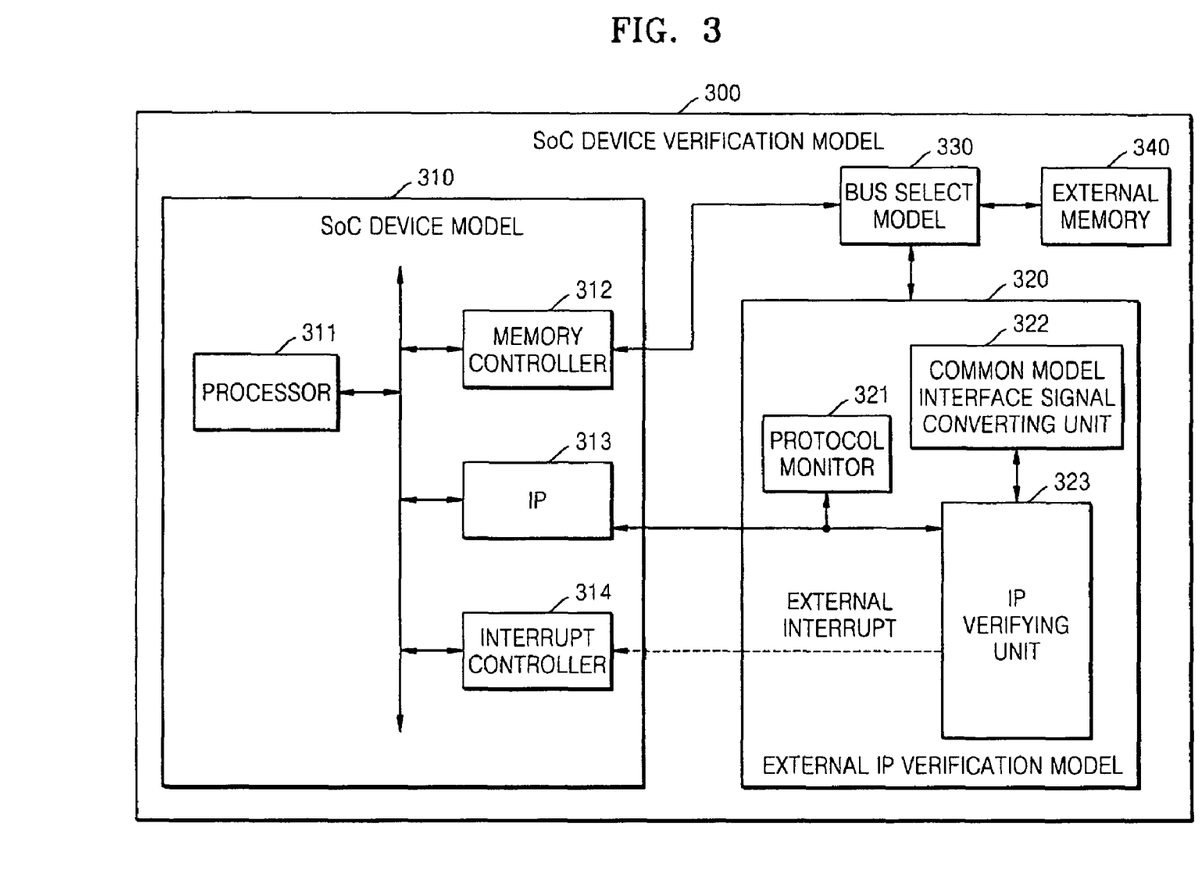
FIG. 3 is a block diagram of an SoC device verification model according to an embodiment of the present invention.

FIG. 3 is a block diagram of an SoC device verification model 300 according to an embodiment of the present invention. Referring to FIG. 3, the SoC device verification model 300 comprises an SoC device model 310, an external IP verification model 320, and a bus select model 330.

The SoC device model 310 comprises, in this example, a processor 311, one or more IPs 313, and a memory controller 312. Each IP 313 may communicate with the external IP verification model 320 via the memory controller 312.

The SoC device model 310 can further comprise an interrupt controller 314. The interrupt controller 314 can receive a signal that is the result of a specific event that occurs in the external IP verification model 320. The external IP verification model 320 can transfer the event-based signal that occurs in the external IP verification model 320 to the interrupt controller of the SoC device model 310 as an external interrupt.

The bus select model 330 receives a memory control signal from the SoC device model 310 and converts the memory control signal into an external model interface signal or otherwise transfers the memory control signal to an external memory 340. The bus select model 330 may select transfer with one of the external IP verification model 320 and the external memory 340 based on an address or data included in the memory control signal. If the bus select model 330 selects the external IP verification model 320 for transfer, the bus select model 330 can transmit a common model interface signal to the external IP verification model 320. If the bus select model 330 selects the external memory 340 for transfer, the bus select model 330 can transmit the memory control signal to the external memory 340.

The external IP verification model 320 can comprise a common model interface signal converting unit 322 and an IP verifying unit 323. The common model interface signal converting unit 322 receives a common model interface signal transferred from the bus select model 330, converts the common model interface signal into a signal suitable for the IP verifying unit 323, and transfers the converted signal to the IP verifying unit 323. The IP verifying unit 323 is a model that verifies the interface of, or the operation of, various internal IPs 313 of the SoC device model 310. For example, the IP verifying unit 323 can be a model described by RTL.

The external IP verification model 320 can further comprise a protocol monitor 321. The protocol monitor 321 examines the operation, including the transfer of signals, between the IP verifying unit 323 and each internal IP 313.

Figure 4:
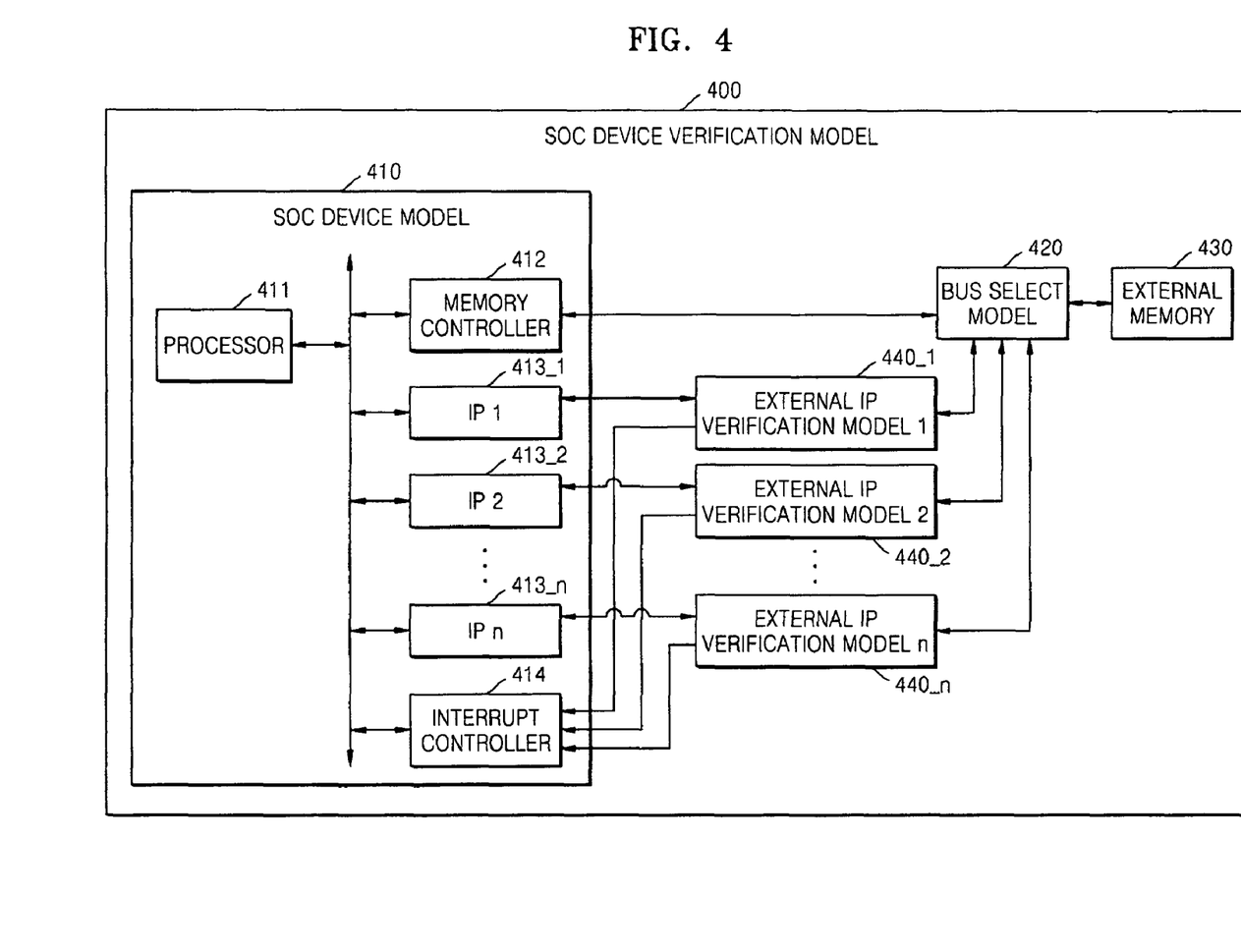
FIG. 4 is a block diagram of an SoC device verification model according to another embodiment of the present invention.

FIG. 4 is a block diagram of an SoC device verification model 400 according to another embodiment of the present invention. Referring to FIG. 4, the SoC device verification model 400 comprises an SoC device model 410, a plurality of external IP verification models 440_1~440_n, and a bus select model 420.

The SoC device model 410 comprises, in this example, a processor 411, a plurality of IPs 413_1~413_n and a memory controller 412. The external IP verification models 440_1~440_n capable of verifying each of the IPs 413_1~413_n is connected to the SoC device model 410 via the bus select model 420. The external IP verification models 440_1~440_n can use different or unique IP verification methods.

The bus select model 420 receives a memory control signal from the SoC device model 410 and determines whether to transfer the memory control signal to an external memory 430 or to the external IP verification models 440_1~440_n based on an address. If the bus select model 420 transfers the memory control signal to the external IP verification models 440_1~440_n, the bus select model 420 converts the memory control signal into common model interface signals based on the address and transfers the common model interface signals to the external IP verification models 440_1~440_n.

The external IP verification models 440_1~440_n receive the common model interface signals from the bus select model 420, convert the common model interface signal into a signal suitable for an IP model to be performed therein, and transfer the converted signal to the bus select model 420. If a request is received, the external IP verification models 440_1~440_n transfer an internal status to the bus select model 420.

Figure 5:
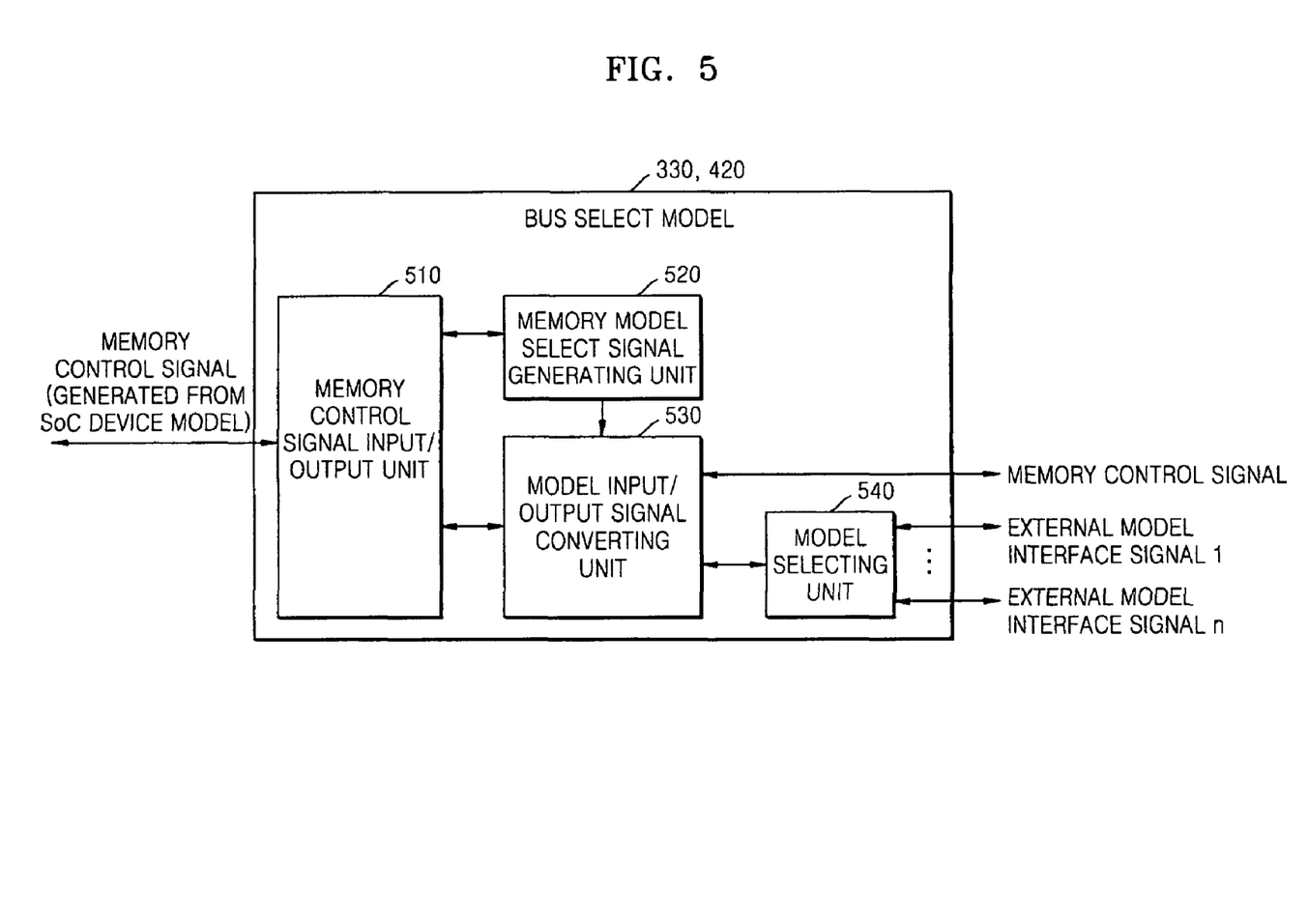
FIG. 5 is a block diagram of a bus select model of FIG. 3 or a bus select model of FIG. 4 according to an embodiment of the present invention.

FIG. 5 is a block diagram of the bus select model 330 of FIG. 3 or the bus select model 420 of FIG. 4 according to an embodiment of the present invention. Referring to FIG. 5, the bus select model 330 or the bus select model 420 comprises a memory control signal input/output unit 510, a memory model select signal generating unit 520, a model input/output signal converting unit 530, and a model selecting unit 540.

The memory control signal input/output unit 510 receives a memory control signal from the memory controllers 312 and 412.

The memory model select signal generating unit 520 generates a memory model select signal according to the type of external memory to be accessed.

The model input/output signal converting unit 530 receives the memory control signal from the memory control signal input/output unit 510 based on the memory model select signal and converts the memory control signal into a common model interface signal compatible with the external IP verification models 323 and 440_1~440_n.

The model selecting unit 540 selects the external IP verification models 323 and 440_1~440_n based on an address of the memory control signal and transfers the common model interface signal to the selected external IP verification model 323 or 440_1~440_n.

Figure 6:
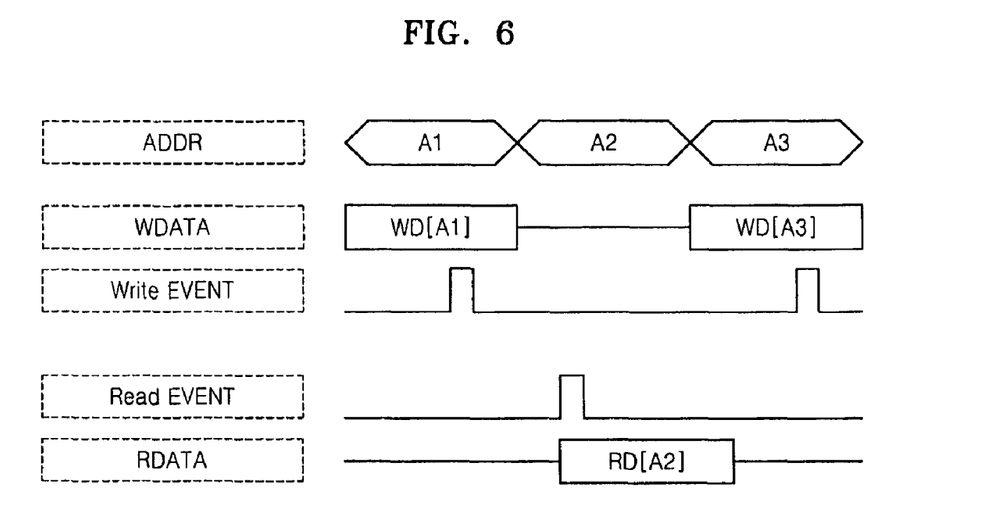
FIG. 6 is a timing diagram of an external model interface signal according to an embodiment of the present invention.

FIG. 6 is a timing diagram of an external model interface signal according to an embodiment of the present invention. Referring to FIG. 6, the model input/output signal converting unit 530 converts various memory control signals into signals as shown and transfers the converted signal to the external memory 340 of FIG. 3 or 430 of FIG. 4.

Figure 7:
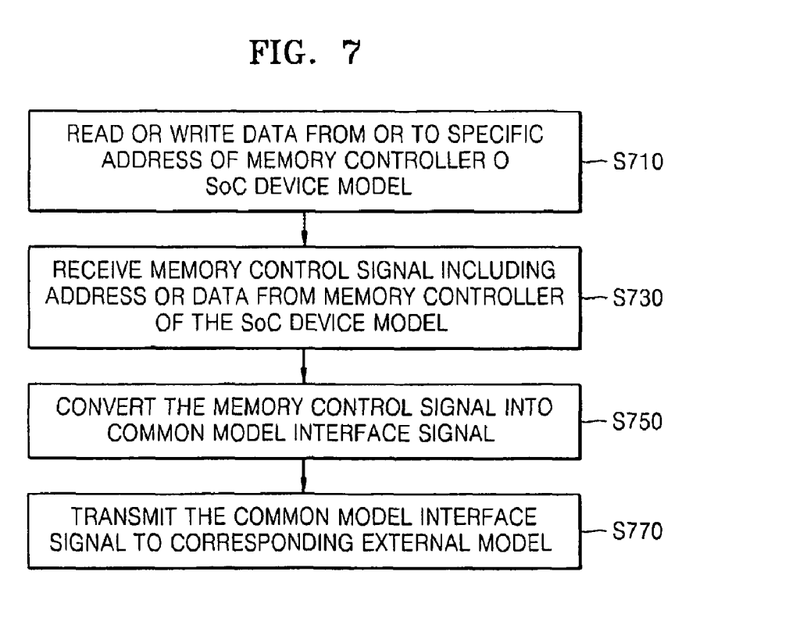
FIG. 7 is a flowchart illustrating an SoC device verification method according to an embodiment of the present invention.

FIG. 7 is a flowchart illustrating an SoC device verification method according to an embodiment of the present invention. Referring to FIG. 7, the SoC device verification method comprises reading or writing data from or to a specific address of a memory controller of an SoC device model (operation 710), receiving a memory control signal including the address or the data from the memory controller of the SoC device model (operation 730), converting the memory control signal into a common model interface signal (operation 750), and transmitting the common model interface signal to a corresponding external model (operation 770).

The common model interface signal may include an address. In operation 770, the common model interface signal may be transmitted to the corresponding external model according to the address.

While the inventive concept has been particularly shown and described with reference to exemplary embodiments thereof, it will be understood that various changes in form and details may be made herein without departing from the spirit and scope of the inventive concept as defined by the following claims.

What is claimed is:

1. A system on a chip (SoC) device verification system comprising:
    an SoC device model including one or more IPs and a memory controller;
    an external IP verification model receiving an instruction from the SoC device model and verifying operation of the one or more IPs included in the SoC device model;
    and a bus select model selecting the external IP verification model and selecting an external device in response to a memory control signal received from the memory controller of the SoC device model, wherein the external IP verification model comprises:
        an IP verifying unit that verifies the operation of the one or more IPs included in the SoC device model; and
    a common model interface signal converting unit receiving a common model interface signal from the bus select model and converting the common model interface signal into a signal that is compatible with the IP verifying unit;
        wherein the IP verifying unit verifies the operation of the one or more IPs in response to the signal generated by the common model interface signal converting unit, and
        wherein the bus select model transmits the common model interface signal to the external IP verification model when selecting the external IP verification model, and transmits the memory control signal to the external device when selecting the external device.

2. The SoC device verification system of claim 1, wherein the external device is an external memory.

3. The SoC device verification system of claim 1, wherein the bus select model comprises:
    a memory control signal input/output unit receiving the memory control signal;
    a memory model select signal generating unit determining a type of a memory instructed by the memory control signal and generating a memory model select signal;
    a model input/output signal converting unit converting the memory control signal into the common model interface signal based on the memory control signal received from the memory control signal input/output unit and the memory model select signal received from the memory model select signal generating unit; and
    a model selecting unit receiving the common model interface signal from the model input/output signal converting unit and transmitting the common model interface signal to a corresponding external model.

4. The SoC device verification system of claim 3, wherein the common model interface signal comprises an address signal,
    wherein the model selecting unit selects the external model based on the address signal.

5. The SoC device verification system of claim 1, wherein the external IP verification model transfers an event that occurs therein to the SoC device model as an external interrupt.

6. The SoC device verification system of claim 5, wherein the SoC device model further comprises: an interrupt controller receiving the external interrupt transferred by the external IP verification model.

7. The SoC device verification system of claim 1, wherein the bus select model selects one of the external IP verification model and the external device based on an address or data included in the memory control signal.

8. The SoC device verification system of claim 1, wherein at least one of the SoC device model, the external IP verification model and the bus select model is described by a register transfer level (RTL).

9. An SoC device verification system comprising:
- an SoC device model including a plurality of IPs and a memory controller;
- a plurality of external IP verification models receiving an instruction from the SoC device model and verifying operation of each of the plurality of IPs included in the SoC device model; and
- a bus select model selecting one of the plurality of external IP verification models in response to a memory control signal received from the memory controller of the SoC device model, wherein each of the external IP verification models comprises:
  - an IP verifying unit that verifies the operation of the one or more IPs included in the SoC device model; and
  - a common model interface signal converting unit receiving a common model interface signal from the bus select model and converting the common model interface signal into a signal that is compatible with the IP verifying unit;
- wherein the IP verifying unit verifies the operation of the one or more IPs in response to the signal generated by the common model interface signal converting unit, and
- wherein the bus select model transmits the common model interface signal to the external IP verification model when selecting the external IP verification model, and transmits the memory control signal to the external device when selecting the external device.

10. The SoC device verification system of claim 9, wherein the bus select model further selects one of the plurality of external IP verification models and the external memory in response to the memory control signal.

11. The SoC device verification system of claim 9, wherein the bus select model selects one of the plurality of external IP verification models based on an address or data included in the memory control signal.

* * * * *